April 8, 1941.  E. R. BERGMANN  2,237,470
SHAKER CONVEYER
Filed Sept. 30, 1939  3 Sheets-Sheet 1

INVENTOR
*Ernst R. Bergmann*
BY
*Clarence J. Poole*
ATTORNEY

April 8, 1941.   E. R. BERGMANN   2,237,470
SHAKER CONVEYER
Filed Sept. 30, 1939   3 Sheets-Sheet 2
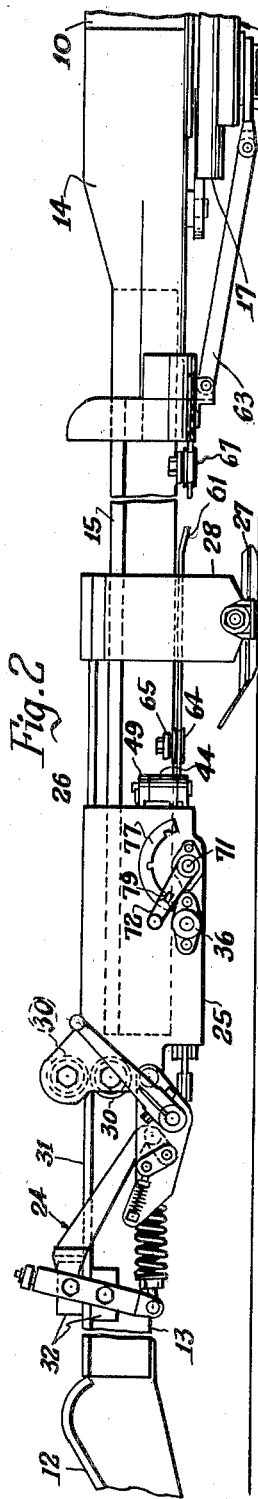
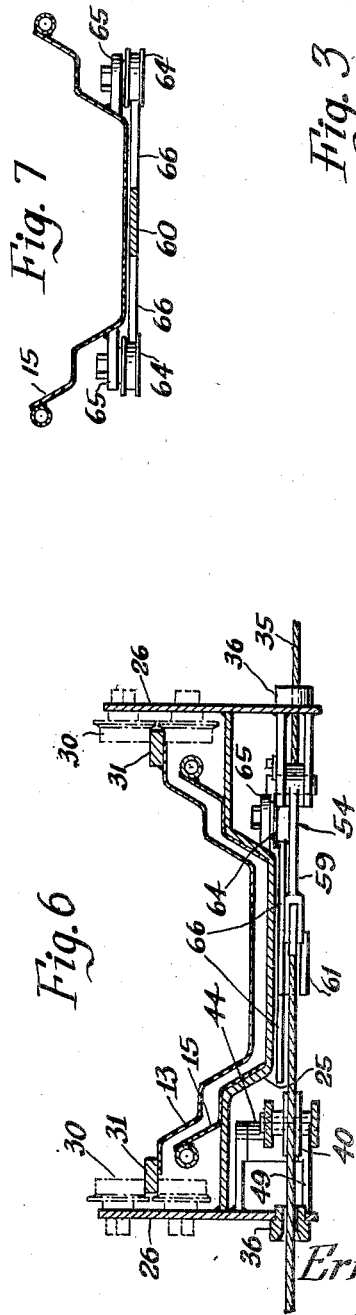
INVENTOR
*Ernst R. Bergmann*
BY
*Clarence F. Poole*
ATTORNEY April 8, 1941.  E. R. BERGMANN  2,237,470
SHAKER CONVEYER
Filed Sept. 30, 1939  3 Sheets-Sheet 3
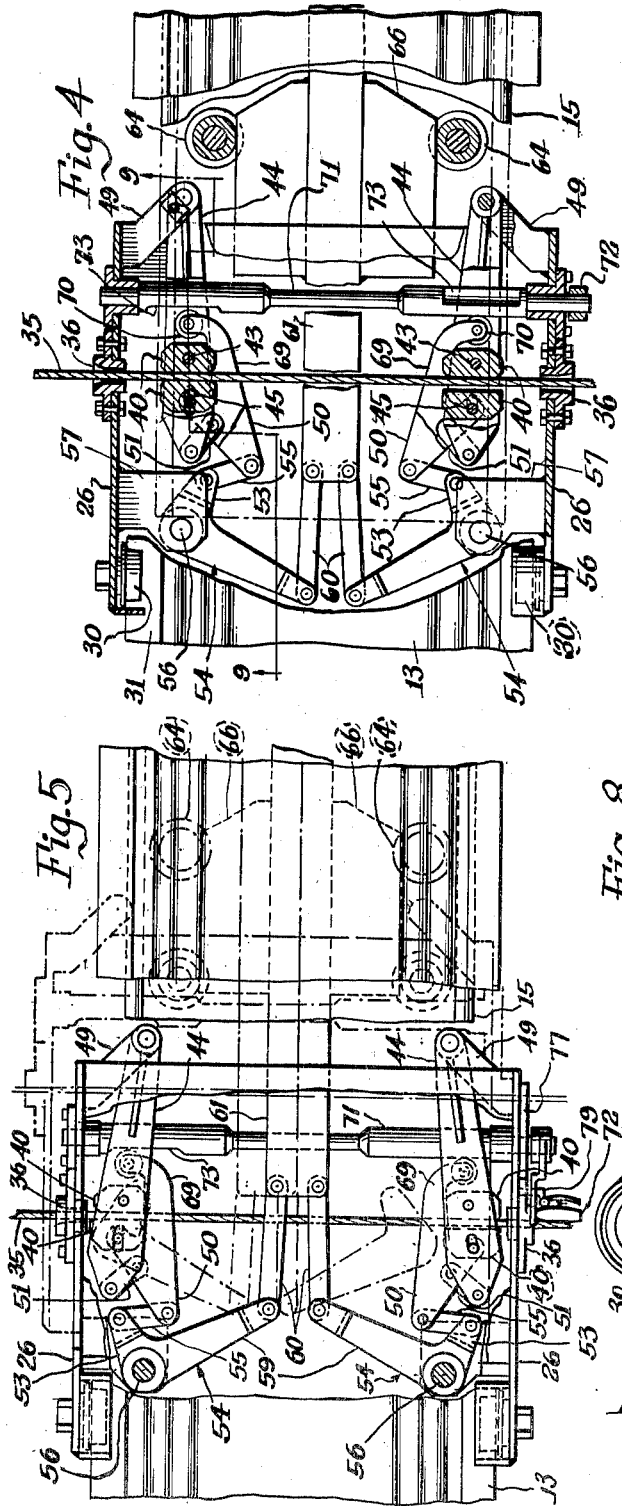
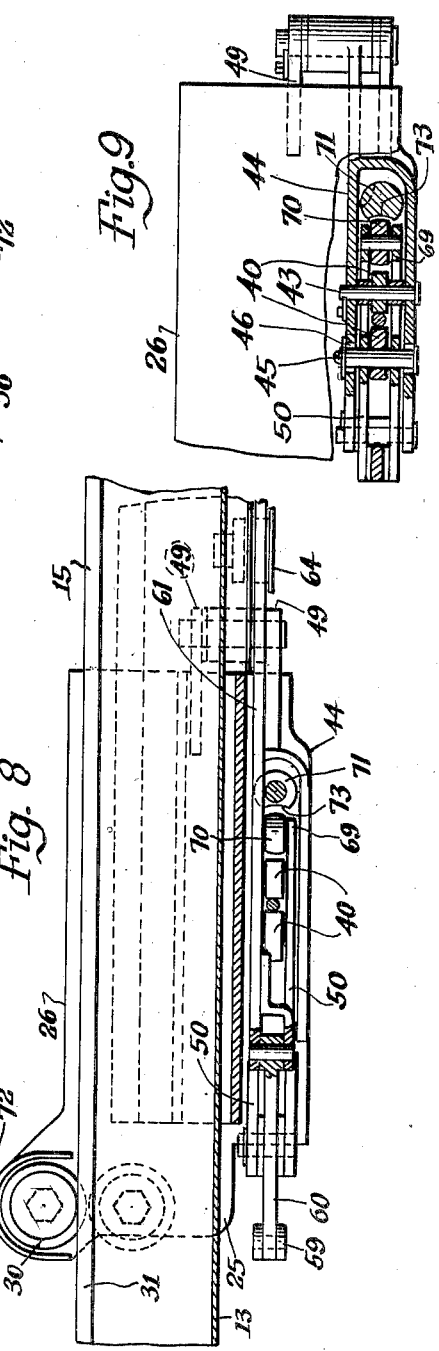
INVENTOR
*Ernst R. Bergmann*
BY
*Clarence F. Poole*
ATTORNEY Patented Apr. 8, 1941

2,237,470

UNITED STATES PATENT OFFICE 2,237,470

SHAKER CONVEYER

Ernst R. Bergmann, Chicago, Ill., assignor to Goodman Manufacturing Company, Chicago, Ill., a corporation of Illinois Application September 30, 1939, Serial No. 297,271

20 Claims. (Cl. 198—220)

This invention relates to improvements in shaker conveyers, and more particularly to an improved means for laterally moving the forward end of a shaker conveyer, to readily position it to pick up material from various parts of the working place of a mine.

The principal objects of my invention are to provide a simple and improved means of a novel construction, selectively operable to laterally move a portion of a shaker conveyer trough line, to permit a pick-up member or shovel on the forward end of the conveyer to be readily positioned to pick up loose material from various parts of the working place of a mine.

A more specific object of my invention is to provide a simple, efficient and compactly arranged feeding means actuated solely by the action of the conveyer, for laterally swinging the in-by end of an extensible shaker conveyer about a swivel.

Other objects of my invention will appear from time to time as the following specification proceeds and with reference to the accompanying drawings wherein:

Figure 2 is a slightly enlarged fragmentary view in side elevation, of the device shown in Figure 1;

Figure 3 is an enlarged view in side elevation of the portion of the conveyer trough line adjacent the swivel, showing certain details of the swivel and the form of connection for actuating the side feeding mechanism;

Figure 4 is an enlarged fragmentary detail plan view of the device, with certain parts broken away and certain other parts shown in horizontal section, illustrating certain details of the lateral swinging mechanism when in one operating position;

Figure 5 is a view somewhat similar to Figure 3, with other parts in section and with the lateral swinging mechanism in another operating position;

Figure 6 is an enlarged transverse sectional view taken substantially along line 6—6 of Figure 1;

Figure 7 is an enlarged transverse sectional view taken substantially along line 7—7 of Figure 1;

Figure 8 is a fragmentary view in side elevation, drawn to a larger scale than Figure 2, with certain parts shown in longitudinal section in order to show certain details of the lateral swinging mechanism; and Figure 9 is an enlarged fragmentary sectional view taken substantially along lines 9—9 of Figure 4.

Figure 1:
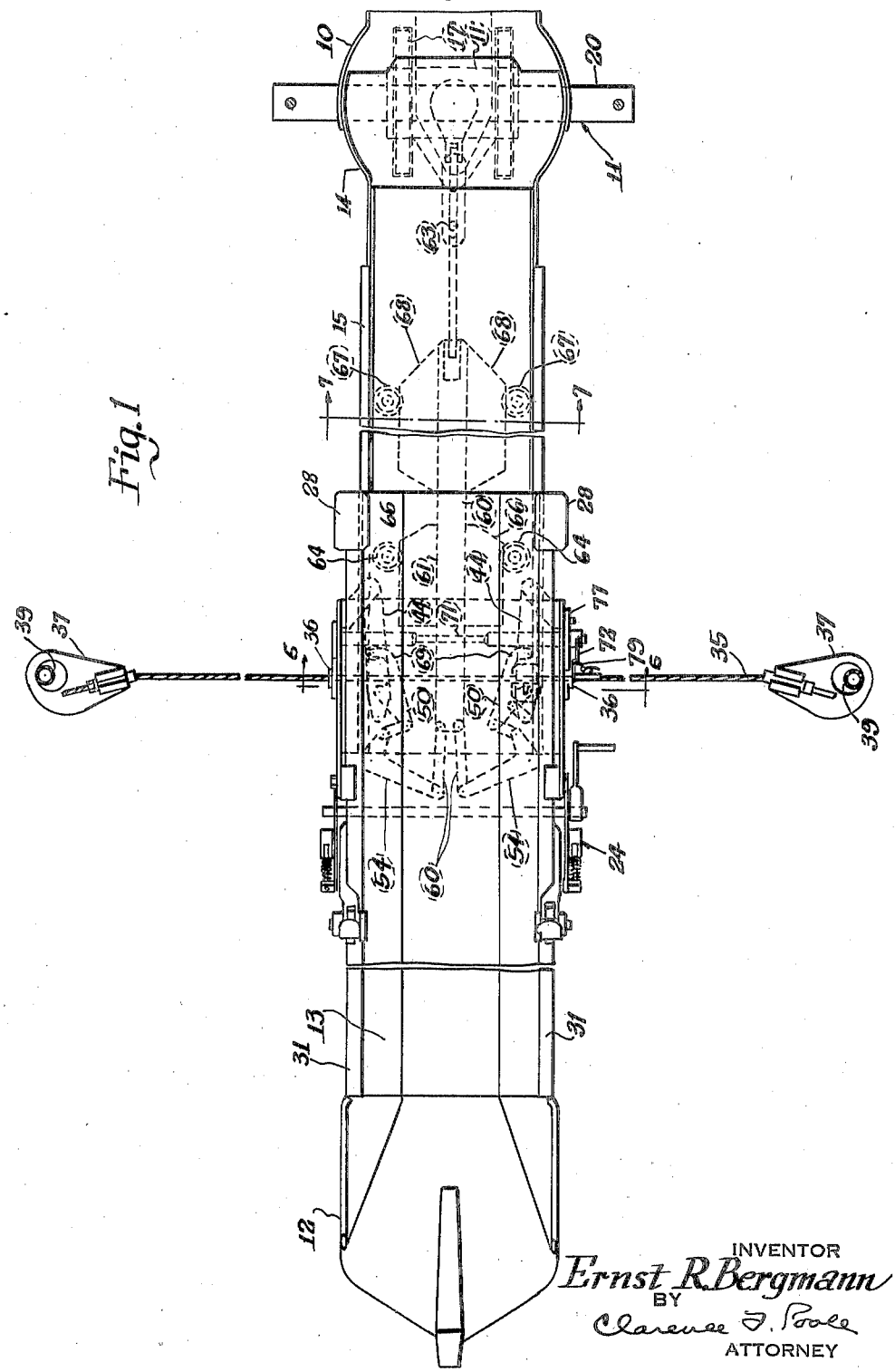
Figure 1 is a plan view of the in-by or pick-up end of an extensible shaker conveyer trough line, having a lateral swinging device constructed in accordance with my invention, associated therewith.

In the drawings, my invention is shown as being incorporated in a shaker conveyer trough line including a trough section 10, forming a part of a swivel 11, about which a pick-up member or shovel 12 on the forward end of an extensible trough section 13 may pivot laterally.

The swivel 11 is of an ordinary construction, herein shown as operating on principles similar to those shown and described in my prior Patent No. 2,129,809, which issued September 13, 1938, so will not herein be described in detail. The forward end of the trough section 10 is of a curved outwardly flared formation and is adapted to receive a curved and flared rear end of a trough section 14, which has a reciprocating trough section 15 secured to its forward end. Said last mentioned trough section is adapted to have the extensible trough section 13 nested therein. The trough sections 10 and 14 are pivotally connected together by a bearing boss 16, pivotally mounted adjacent its lower end in a guide frame 17 (see Figure 3). Said guide frame is herein shown as being of the ordinary ball type of guide frame, and is not shown or described in detail since it is no part of my present invention. Said guide frame is mounted on a bearing member 19, for swiveling movement in a horizontal plane and limited pivotal movement in a vertical plane. Said bearing member is secured to a transverse support member 20, adapted to be held in position on the ground by means of suitable jacks (not shown), interposed between said support member and the mine roof, in a usual manner.

The reciprocating trough section 15 has feeding mechanism generally indicated by reference character 24 projecting from the forward end thereof, for extending or retracting the extensible trough section 13 with respect to said reciprocating trough section, to advance the shovel 12 into the material it is desired to load, or retract said extensible trough section into said reciprocating trough section. Said feeding mechanism is of a type similar to that shown and described in a prior application Serial No. 187,145, filed by me on January 27, 1938, now Patent No. 2,186,472, and is no portion of my present invention so will not herein be shown or described in detail. Said feeding mechanism is pivotally mounted on and projects forwardly from opposite lower forward ends of a frame or bracket member 25, mounted on the forward end of said reciprocating trough section. Said bracket member extends beneath said trough section and includes a pair of parallel spaced upright walls 26, 26 extending above and below the trough sections 13 and 15 and a slight distance beyond the forward end of the trough section 15.

The rear end of the extensible trough section 13 is transversely pivoted on a shoe 27, adapted to slidably engage the ground, by means of a pair of parallel spaced supporting legs 28, 28. Said extensible trough section forms a support for the forward end of the reciprocating trough section 15, which is mounted for free movement along said extensible trough section on two pairs of flanged rollers 30, 30, mounted in the side frame members 26, 26 of the bracket 25 and adapted to ride along bearing plates 31, 31 projecting laterally from and extending along the upper edges of said extensible trough section. Said bearing plates are also adapted to be selectively engaged by friction grip blocks 32, 32 of the feeding mechanism 24, to cause said extensible trough section to be extended from or retracted within said reciprocating trough section, or to move in unison therewith.

Referring now in particular to certain of the novel features of my invention, the laterally swinging mechanism is herein shown as including a flexible member 35, clamped at its ends to clamping members 37, 37 and held in position by jacks 39, 39 secured between the mine roof and floor in a usual manner (see Figure 1). Said flexible member is trained through flanged sleeves 36, 36 mounted in opposite side walls 26, 26 of the bracket 25 and is adapted to be gripped by a laterally movable feeding means and form a reaction member along which the trough sections 13 and 15 may be moved. Said flexible member is herein shown as being a cable although it should be understood that if desired a chain, flexible belting, or other type of flexible member could be used instead, and that other types of feeding mechanisms could be utilized to swing said trough sections laterally, in place of the specific form of feeding mechanism illustrated in the present embodiment of my invention. In the form of the invention illustrated herein, two pairs of spaced apart grip blocks 40, 40 are provided (see Figures 4, 5, 8 and 9). Said grip blocks are so arranged that either pair of said grip blocks may selectively grip the cable 35, during certain strokes of the conveyer, to move the trough sections 13 and 15 laterally along said cable. Each pair of grip blocks is disposed adjacent one side of the conveyer and said grip blocks are so arranged that one pair may move the extensible trough section laterally in one direction while the opposite pair may move said extensible trough section laterally in an opposite direction. Inasmuch as each of said pairs of grip blocks operates and is actuated in a similar manner, only one pair of said grip blocks need herein be described in detail.

One grip block 40 is mounted between the upper and lower spaced apart sides of a grip block carrier member 44, on a vertical pin 43. The other of said grip blocks is mounted between the upper and lower sides of said carrier member on a vertical pin 45. This last mentioned pin is mounted adjacent its opposite ends in said carrier member in slots 46, 46, to permit said grip blocks to be disengaged from the flexible member 35 when desired (see Figure 9). The carrier member 44 is pivotally mounted on a bracket 49 at its rear end, which bracket projects rearwardly and inwardly from the rear end of the upright side wall 26. The opposite end of said carrier member is connected with an actuating link 50 by means of a link 51 (see Figures 4 and 5). Said actuating link has a bifurcated end which extends between the upper and lower sides of said carrier member and above and below the grip block 40, and is pivotally connected thereto on the vertical pin 45. The opposite end of said actuating link is connected to one lever arm 53 of a bell crank 54 by means of a link 55. Said bell crank is mounted in the frame 25 on a vertical shaft 56. Said shaft is mounted at its ends on brackets 57, 57, projecting inwardly from the side frame member 26.

Connections are provided which are connected to lever arms 59, 59 of the bell cranks 54, 54 to rock said bell cranks about the vertical axis of the shaft 56 by reciprocable movement of the conveyer. The swivel 11 is herein utilized as a stationary member to which said last mentioned lever arms are attached to cause rocking movement of said bell cranks upon rectilinear movement thereof with the conveyer. The connections from said swivel to said bell cranks include links 60, 60. Each of said links is pivotally connected to the end of the lever arm 59 at one of its ends, and pivotally connected to a longitudinally extending connecting member 61 at its opposite end. Said connecting member is in turn pivotally connected to the transverse support member 20 by means of a connecting link 63, transversely pivoted to a member 62, journaled on the bearing member 19 beneath the guide frame 17 (see Figure 3).

The connecting member 61 is guided in longitudinal alignment with the trough section 15, during reciprocable movement of the conveyer, by means of a pair of spaced apart grooved rollers 64, 64 depending from the bottom of said trough section and mounted on brackets 65, 65, projecting laterally from opposite sides thereof. Said rollers are adapted to engage the edges of spaced apart guide plates 66, 66 secured to and projecting laterally from opposite sides of the connecting member 61. Another pair of grooved guide rollers 67, 67 is mounted on the bottom of said trough section rearwardly of the guide rollers 64, 64. Said rollers are adapted to engage the outer edges of guide plates 68, 68, secured to and projecting laterally from the rear end of said connecting member.

It may be seen from the foregoing that inasmuch as the connecting member 61 is connected to the stationary frame 20 for the swivel 11 and to the lever arms 59, 59 of the bell cranks 54, 54, that reciprocable movement of the conveyer will cause rocking movement of said bell cranks which move rectilinearly with the trough section 15. During the forward stroke of the conveyer said bell cranks will move from the position shown in Figure 4 to that shown in Figure 5. During this movement the actuating link 50 will tend to pivot about the axis of connection of the link 51 thereto and pivot the carrier member 44 in a clockwise direction, to engage the grip blocks 40, 40 with the flexible member 35. Continued pivotal movement of said actuating link and carrier member will tend to move the grip blocks 40, 40 towards the side 26 of the frame 25. Due to the gripping connection between said grip blocks and flexible member, which is fixed at its ends, movement of said grip blocks towards the side 26 will cause the entire frame 25 and troughs 15 and 13 to move towards said grip blocks, and swing the shovel 12 about the axis of the swivel 11.

Either or both sets of grip blocks 40, 40 are rendered inoperative, to permit swinging movement of the extensible trough section to be controlled at will, by means of an arm 69 extending rearwardly from each actuating link 50. Said arm has a roller 70 mounted on the end thereof, which is adapted to engage a transversely extending shaft 71, pivotally mounted adjacent its ends on the upright walls 26, 26 of the frame 25. Said shaft is turned to permit the desired set of grip blocks to be in an operative position by means of a hand lever 72 which is mounted on one end of said shaft. A pair of spaced apart recessed portions 73, 73 is provided in said shaft, which are adapted to be selectively registered with the rollers 70, 70. Said recessed portions are in different angular positions with respect to each other, so that one pair of grip blocks may be held inoperative by means of said shaft while the other pair is operative. When it is desired that one set of grip blocks be in an operative position, the shaft 71 must be so positioned that the associated roller 70 will extend within the recessed portion 73 of said shaft, to permit the grip blocks 40, 40 to be moved into engagement with the flexible member 35 by the actuating link 50. When it is desired to render one set of grip blocks inoperative, said shaft is turned until the desired roller 70 engages the outer periphery of said shaft, and when it is desired that both sets of grip blocks be in an inoperative position, said shaft is turned until both rollers 70, 70 engage the periphery thereof. This will cause forward movement of the actuating link 50 and move the pin 45 forwardly in the slots 46, 46, to positively disengage the block 40 associated with said pin, from the flexible member 35, as may be seen with reference to Figures 4 and 5.

A locking sector 77 is mounted on the outer side of the side wall 26 adjacent the hand lever 72. Said sector has a plurality of spaced apart locking notches adapted to be engaged by a locking pin 79 on said hand lever, for locking the shaft 71 in the desired position, to permit side feeding of the extensible trough section 13 in either direction, or to render both sets of grip blocks 40 inoperative.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, a reciprocating trough section, a member fixed adjacent its ends and extending transversely of said trough section, and gripping means movable relatively with respect to said member and actuated solely by reciprocable movement of the conveyer and adapted to grip said member during certain strokes of the conveyer, for swinging said reciprocating trough section laterally.

2. In a shaker conveyer, a reciprocating trough section, and means for feeding said reciprocating trough section laterally including a member extending transversely of the conveyer and means selectively engageable with said member and movable relatively with respect thereto, for moving said trough section therealong.

3. In a shaker conveyer, a reciprocating trough section, a flexible member extending transversely of said trough section and fixed from movement laterally of said trough section adjacent its ends, and means moved relatively with respect to said flexible member by movement of the conveyer and selectively operable to grip said flexible member during certain strokes of the conveyer to positively move said trough section along said flexible member upon reciprocable movement of the conveyer.

4. In a shaker conveyer, a reciprocating trough section, and means for feeding said reciprocating trough section laterally including a member extending transversely of the conveyer and means selectively engageable with said member for moving said trough section therealong including gripping means adapted to alternately grip and be released from said member and move said trough section in a transverse direction when in a gripping position with respect to said member.

5. In a shaker conveyer, a reciprocating trough section, and means for swinging said reciprocating trough section laterally including a transversely extending member, gripping means adapted to alternately grip and be released from said member and move said trough section in a lateral direction when in a gripping position with respect to said member, and means actuated solely by the action of the conveyer for actuating said gripping means including a member held from reciprocable movement with respect to the conveyer.

6. In a shaker conveyer a reciprocating trough section, and means actuated by reciprocable movement of the conveyer for swinging said reciprocating trough section laterally including a transversely extending member, gripping means movable relatively with respect to said member and adapted to grip and be released from said member during certain strokes of the conveyer, and means movable transversely of the conveyer for actuating said gripping means including a rocking member, a connection from said rocking member to said gripping means, and means for rocking said rocking member.

7. In a shaker conveyer, a reciprocating trough section, and means actuated by reciprocable movement of the conveyer for swinging said reciprocating trough section laterally including a transversely extending member, gripping means adapted to alternately grip and be released from said member, and a connection for actuating said gripping means including a rocking member mounted on said reciprocating trough section and having an arm rocking in a direction transversely of the conveyer, a connection from said arm to said gripping means for alternately gripping said gripping means with and releasing said gripping means from said transversely extending member and moving said trough section laterally along said member when said gripping means is in gripping engagement therewith.

8. In a shaker conveyer, a reciprocating trough section, and means actuated by reciprocable movement of the conveyer for swinging said reciprocating trough section laterally including a transversely extending member, gripping means adapted to alternately grip and be released from said member, and a connection for actuating said gripping means including a rocking member mounted on said reciprocating trough section, a connection from said rocking member to said gripping means for moving said trough section laterally along said member when said gripping means is in gripping engagement therewith, a member held from reciprocable movement with respect to the conveyer, for rocking said rocking member, and means selectively operable to positively disengage said gripping means from said transversely extending member.

9. In a shaker conveyer and in combination with a reciprocating trough section, means for selectively feeding said reciprocating trough section laterally in opposite directions including a flexible member fixed adjacent its ends and means selectively operable to alternately grip and be released from said flexible member upon opposite strokes of the conveyer including two pairs of grip blocks associated with said reciprocating trough section, one of said pairs being operable to swing said trough section in one direction and the other of said pairs being operable to swing said trough section in an opposite direction.

10. In a shaker conveyer and in combination with a reciprocating trough section, means for selectively feeding said reciprocating trough section laterally in opposite directions including a flexible member fixed adjacent its ends and a plurality of gripping means selectively operable to positively grip and be released from said flexible member upon opposite strokes of the conveyer, and means actuated by reciprocable movement of the conveyer for alternately gripping selective of said gripping means with and releasing said gripping means from said flexible member and exerting a force on said gripping means in a direction to move said trough section along said member including a pair of rocking members mounted on said reciprocable trough section and having operative connection with said gripping means.

11. In a shaker conveyer and in combination with a reciprocating trough section, means for selectively feeding said reciprocating trough section laterally in opposite directions including a flexible member fixed adjacent its ends and a plurality of gripping means selectively operable to positively grip and be released from said flexible member upon the forward and return strokes of the conveyer, and means actuated by reciprocable movement of the conveyer for alternately gripping selective pairs of said gripping means with and releasing said gripping means from said flexible member and exerting a force on said gripping means in a direction to move said trough section laterally along said member including a pair of rocking members mounted on said reciprocating trough section and a member held from reciprocable movement with respect to said trough section, having operative connection with said rocking members.

12. In a shaker conveyer and in combination with a reciprocating trough section, means for selectively feeding said reciprocating trough section laterally in opposite directions including a flexible member fixed adjacent its ends and a plurality of gripping means selectively operable to positively grip and be released from said flexible member upon the forward and return strokes of the conveyer, and means operable by reciprocable movement of the conveyer for gripping selective of said gripping means with and releasing said gripping means from said flexible member and exerting a force on said gripping means in a direction to move said trough section laterally along said member including a pair of rocking members mounted on said reciprocable trough section, means operable due to rectilinear movement of said rocking members with the conveyer, for rocking said rocking members, and means for selectively rendering either or both pairs of said gripping means inoperative.

13. In a shaker conveyer, and in combination with a shaker conveyer trough line, a swivel, an extensible trough section connected thereto for horizontal swinging movement about the axis thereof, and means operated by reciprocable movement of the conveyer for swinging said extensible trough section about the axis of said swivel including a reaction member fixed adjacent its ends and extending transversely of said extensible trough section, and means movable relatively with respect to said reaction member and selectively operable to grip said reaction member during certain strokes of the conveyer and feed said extensible trough section therealong.

14. In a shaker conveyer, and in combination with a shaker conveyer trough line, a swivel, an extensible trough section connected thereto for horizontal swinging movement about the axis thereof, and means operated by reciprocable movement of the conveyer, for swinging said extensible trough section about the axis of said swivel including a reaction member extending transversely of said extensible trough section and fixed adjacent its ends, two pairs of gripping means, means selectively operable to permit one pair of said gripping means to grip said member to feed said extensible trough section therealong in one direction and permit said other pair of gripping means to grip said member and feed said trough section therealong in an opposite direction, and means for gripping respective of said gripping means with said transversely extending member and exerting a force thereon in a direction to swing said trough section towards said gripping means, when engaged with said reaction member.

15. In a shaker conveyer, and in combination with a shaker conveyer trough line, a swivel, an extensible trough section connected thereto for horizontal swinging movement about the axis thereof, and means operated by reciprocable movement of the conveyer for swinging said extensible trough section about the axis of said swivel including a member extending transversely of said extensible trough section and fixed from lateral movement adjacent its ends and two pairs of gripping means arranged so that one pair of said gripping means may grip said member to feed said extensible trough section in one direction and the other pair of said gripping means may grip said member and feed said trough section in an opposite direction, and means for gripping respective of said gripping means with said transversely extending member and exerting a force thereon in a direction to swing said trough section along said member towards said gripping means, including a member fixed from reciprocable movement with respect to the conveyer and a linkage connection between said member and said gripping means.

16. In a shaker conveyer and in combination with a reciprocating trough section, means for swinging said trough section laterally about a vertical axis including a flexible member extending transversely of said trough section and held from lateral movement adjacent its ends, and gripping means mounted on said reciprocating trough section for gripping said flexible member and moving said trough section therealong towards said gripping means including a pivoted carrier member disposed beneath said trough section, a pair of grip blocks mounted on said carrier member, and means for pivotally moving said carrier member in one direction and gripping said grip blocks with said flexible member and exerting a force on said flexible member to move said trough section along said member towards said grip blocks.

17. In a shaker conveyer and in combination with a reciprocating trough section, means for swinging said trough section laterally about a vertical axis including a flexible member extending transversely of said trough section and held from lateral movement adjacent its ends, and gripping means mounted on said reciprocating trough section for gripping said flexible member and moving said trough section therealong towards said gripping means including a carrier member disposed beneath said trough section and pivoted for movement in a horizontal plane, a pair of grip blocks mounted on said carrier member, means for pivotally moving said carrier member in one direction and gripping said grip blocks with said flexible member and exerting a force thereon to move said trough section along said member, and in an opposite direction to release said grip blocks from said flexible member including a rocking member, linkage connections between said rocking member and said grip blocks and said carrier member, and a member having connection with said rocking member and fixed from reciprocable movement with respect to said reciprocating trough section.

18. In a shaker conveyer and in combination with a reciprocating trough section, means for swinging said trough section laterally about a vertical axis including a flexible member extending transversely of said trough section and held from lateral movement adjacent its ends, and gripping means mounted on said reciprocating trough section for gripping said flexible member and moving said trough section therealong towards said gripping means including a carrier member disposed beneath said trough section and pivoted for movement in a horizontal plane, a pair of grip blocks mounted on said carrier member, means for pivotally moving said carrier member in one direction and gripping said grip blocks with said flexible member and exerting a force thereon to move said trough section along said member, and in an opposite direction to release said grip blocks from said flexible member including a rocking member, linkage connections between said rocking member and said grip blocks and said carrier member, a member having connections with said rocking member and fixed from reciprocable movement with respect to said reciprocating trough section, and means selectively operable to positively disengage said gripping means from said flexible member.

19. In a shaker conveyer and in combination with a reciprocating trough section, means for swinging said trough section laterally about a vertical axis including a flexible member extending transversely of said trough section and held from lateral movement adjacent its ends, a plurality of gripping means, said gripping means being mounted adjacent opposite sides of said reciprocating trough section, means selectively operable to permit either of said gripping means to grip said flexible member and move said trough section therealong including a carrier member disposed adjacent each side of said reciprocating trough section, a pair of grip blocks pivotally mounted in each of said carrier members, and means for pivotally moving selective of said carrier members in one direction and exerting a force on said grip blocks to grip said grip blocks with said flexible member and move said trough section therealong towards said respective grip blocks including a pair of rocking members and linkage connections between said rocking member and said grip blocks and said carrier members.

20. In a shaker conveyer and in combination with a reciprocating trough section, means for swinging said trough section laterally about a vertical axis including a flexible member extending transversely of said trough section and held from lateral movement adjacent its ends, a plurality of gripping means, said gripping means being mounted adjacent opposite sides of said reciprocating trough section, means selectively operable to permit either of said gripping means to grip said flexible member and move said trough section therealong including a carrier member disposed adjacent each side of said reciprocating trough section, a pair of grip blocks pivotally mounted in each of said carrier members, means for pivotally moving selective of said carrier members in one direction and exerting a force on said grip blocks to grip said grip blocks with said flexible member and move said trough section therealong towards said respective grip blocks including a pair of rocking members and linkage connections between said rocking members and said grip blocks and said carrier members, and means actuated solely by reciprocable movement of the conveyer for rocking said rocking members including a member held from reciprocable movement with repsect to the conveyer and having connection with said rocking members.

ERNST R. BERGMANN.